Figure 1:
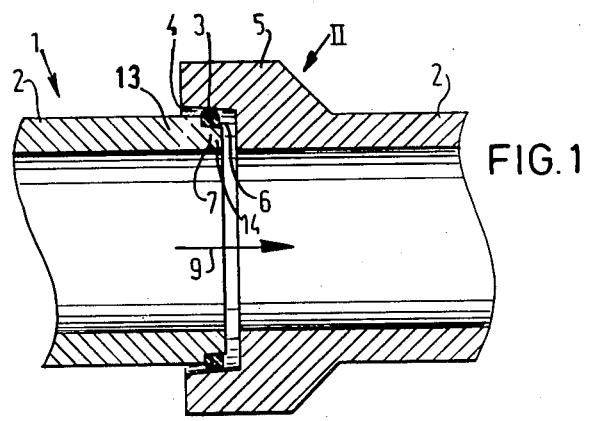

United States Patent [19]

Wolters et al.

[11] 4,449,720

[45] May 22, 1984

[54] WATERTIGHT SEAL BETWEEN TWO CONCRETE ELEMENTS

[75] Inventors: Tjako A. Wolters, Zeist; Aloysius G. Roggekamp, Alphen an der Rijn, both of Netherlands

[73] Assignees: Ballast-Nedam Groep N.V., Amstelveen; Waco Beton B.V., Ijssel, both of Netherlands

[21] Appl. No.: 322,178

[22] Filed: Nov. 17, 1981

[30] Foreign Application Priority Data

Jan. 8, 1981 [EP] European Pat. Off. ........ 81200017.2

[51] Int. Cl.³ .............................................. F16J 15/32
[52] U.S. Cl. .............................................. 277/207 A
[58] Field of Search ......... 277/207 A, 207 R, DIG. 2

[56] References Cited

U.S. PATENT DOCUMENTS 3,015,510  1/1962  Bates ............................ 277/207 A

FOREIGN PATENT DOCUMENTS 682728  3/1964  Canada .......................... 277/207 A
1479549  3/1967  France ........................... 277/207 A Primary Examiner—Robert I. Smith
Attorney, Agent, or Firm—Diller, Ramik & Wight

[57] ABSTRACT

A watertight seal (1) between two adjoining channel-shaped concrete elements (2) has an elastic sealing strip (3) sandwiched between a socket (5) of one concrete element (2) enveloped by the socket (5). The sealing strip (3) is recessed and has a transverse profile such, that when the socket is slid over the wedge (7), material (12) of the sealing strip (3) shifts in a direction contrary to movement of the socket in order to prevent damage of the sealing strip.

5 Claims, 26 Drawing Figures

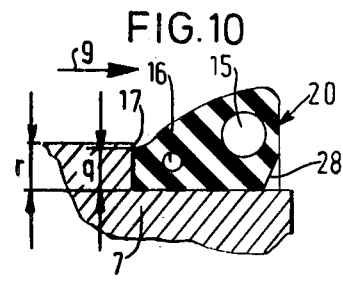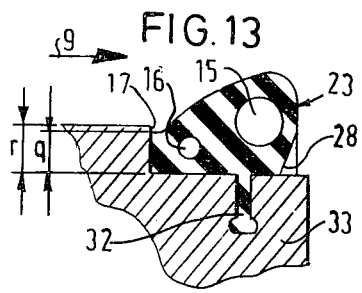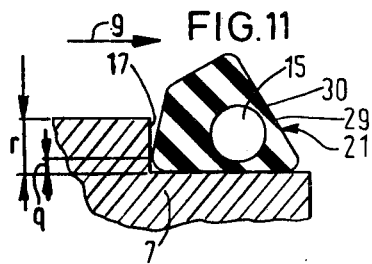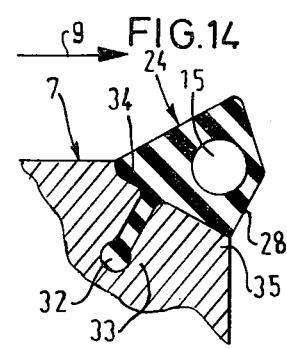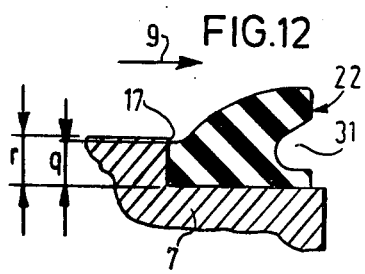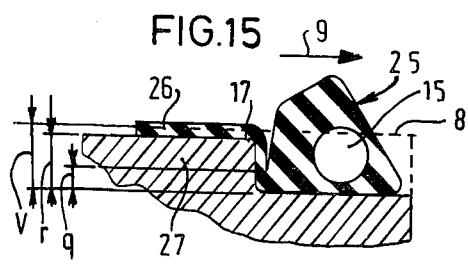

WATERTIGHT SEAL BETWEEN TWO CONCRETE ELEMENTS

The invention relates to a watertight seal between two adjoining, prefabricated culvert elements, tunnel sections, sewer pipes or similar concrete elements, in which an elastic sealing strip is sandwiched between a sealing surface of a socket of one concrete element and a sealing surface of a wedge of the other concrete element enveloped by the socket, in which one sealing surface has a groove retaining the elastic sealing strip in an axial direction and the other sealing surface—viewed in the direction from the bonded end of the wedge towards the free end of the wedge—is converging and in which the profile of the sealing strip, in the unstressed state, has a ridge directed towards the converging sealing surface and adjoining a profile face diverging in the direction of convergence of the converging sealing surface.

Such a seal is known from GB-A-No. 464,087. When its concrete elements are slid to one another the material of the sealing strip may be jammed between the edge of the groove and the opposite surface, so that the sealing strip may be damaged and/or the socket may break down due to excessive radial stress. Moreover, in the case of large tolerance of the sealing surfaces the watertightness is not ensured, because the radial contact pressure of the sealing strip on the sealing surfaces is highly dependent on the degree of flattening of the sealing strip, which varies with the noncircularity, the accuracy of dimensions and aligning defects. The aligning defects are involved in mounting operations and/or subsidence of the subsoil supporting the concrete elements.

The invention has for its object to improve the watertight seal of the kind set forth in the preamble. To this end at least one channel is made in the elastic material of the sealing strip, whilst the sealing strip has a transverse profile, such that, when the two concrete elements are joined, material of the sealing strip shifts in a converging direction of the converging sealing surface.

In this way it is avoided that material becomes jammed between the edge of the groove and the opposite sealing surface, since the shifting material moves away from said edge. Furthermore, the material of the sealing strip pushed towards a free space remains available as undamaged spare material for expanding, if necessary, in a radial sense and for nestling with adequate contact pressure against the opposite sealing surface to guarantee a watertight seal.

When the channel is filled with fluid and when the wedge and the socket are asymmetrically disposed, this fluid tends to shift in a tangential direction from a narrow towards the wide zone of the sealing gap. Thus in the area of the narrow zone the material of the sealing strip can more readily shift towards the free space, whereas in the area of the wide zone the sealing strip is, so to say, additionally pumped with a hardly compressible fluid. If the channel is bounded on all sides by elastic material of the sealing strip and is filled with air, this technical effect is also produced, be it to a lesser extent.

In an asymmetrical sealing strip the channel is preferably located on the side of the sealing strip remote from the groove edge.

If the sealing strip also has a stop sleeve disposed outside of the groove, this stop sleeve operates as a bed absorbing the high forces with which the concrete elements bear one on the other. Thus the seal is relieved of these high bearing forces, so that in the area of the sealing surfaces the sealing strip can be flexible and deformable over a large radial distance.

The invention furthermore improves a watertight seal between two adjoining, prefabricated culvert elements, tunnel sections or suchlike concrete elements, in which an elastic sealing strip is sandwiched between a sealing surface of a socket of one concrete element and a sealing surface of a wedge of the other concrete element enveloped by the socket, at least one sealing surface having a groove accommodating the elastic sealing strip, so that particularly in the event of appreciable and/or frequent relative axial displacement of the concrete elements the watertightness remains guaranteed. According to the invention this is achieved by providing the sealing strip with a first anchor ring accommodated in a watertight relationship in a groove of one sealing surface, with a second anchor ring held in watertight relationship in a groove of the other sealing surface and with a sleeve arranged between the two anchor rings and allowing a relative, axial displacement of the anchor rings. In this case each anchor ring ensures the watertightness with respect to the associated concrete element, whilst the sleeve ridges in a watertight manner the axial distance between the anchor rings irrespective of changes of said distance.

When the sleeve is folded in axial direction, a large axial displacement between the concrete elements is allowed.

When one of the grooves is wedge-shaped in an axial direction, the anchor ring can be readily arranged in sealing relationship with the groove, particularly so when the wedge-shaped groove of one concrete element—viewed in an axial direction—is disposed opposite an edge of the other concrete element.

In a further variant the watertightness can be readily obtained in the area of the anchor ring by embedding at least one of the two anchor rings in the concrete of the associated element during its manufacture.

Mounting a pipe of concrete element with watertight seals according to the invention is facilitated by shaping the sealing strip in the form of at least two rings connected with one another by a watertight coupling. This coupling may be a snap joint or a slide joint.

When the sealing strip consists of three rings coupled by watertight joints i.e. a first anchor ring, a second anchor ring and an intermediated sleeve ring, the sleeve may even be arranged in place after the concrete elements are put in their places.

The invention will be described more fully hereinafter with reference to a drawing.

Figure 2:
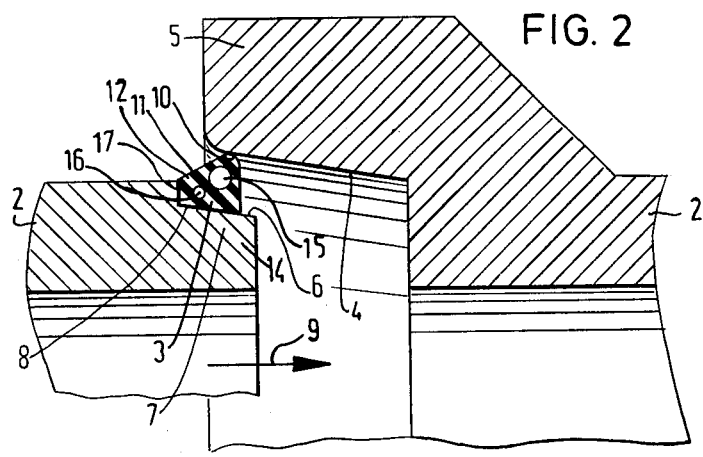
Figure 3:
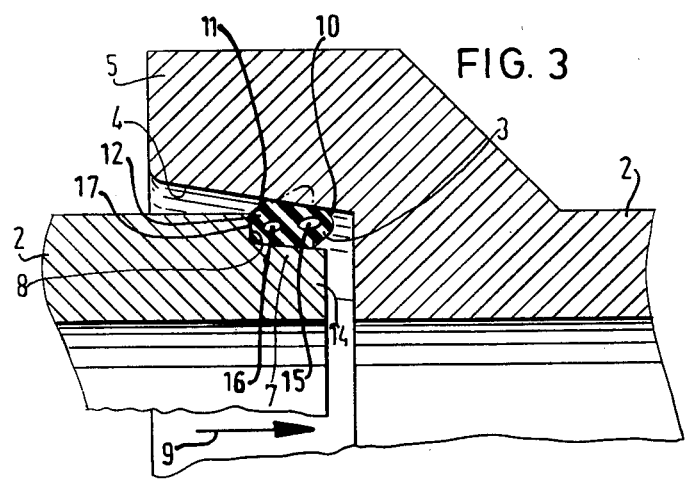
Figure 4:
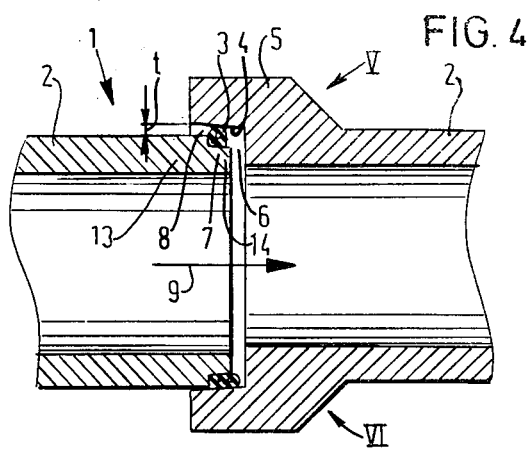
Figure 5:
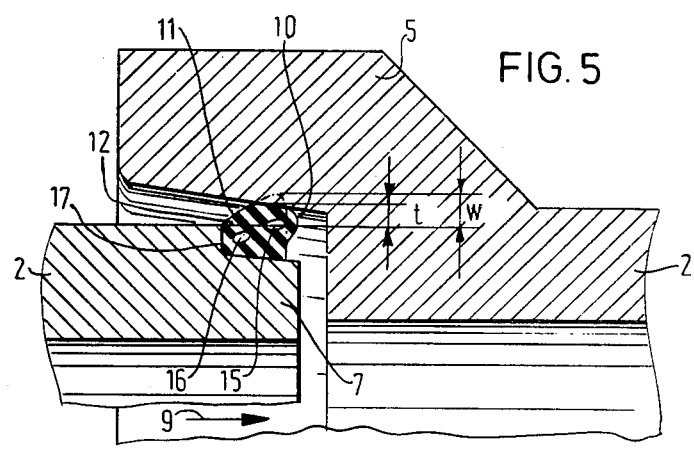
Figure 6:
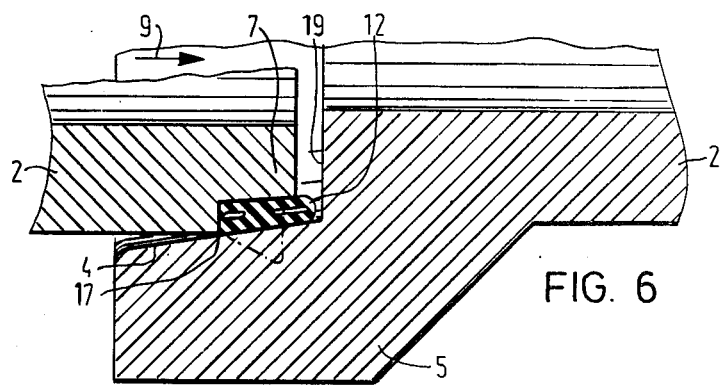
Figure 7:
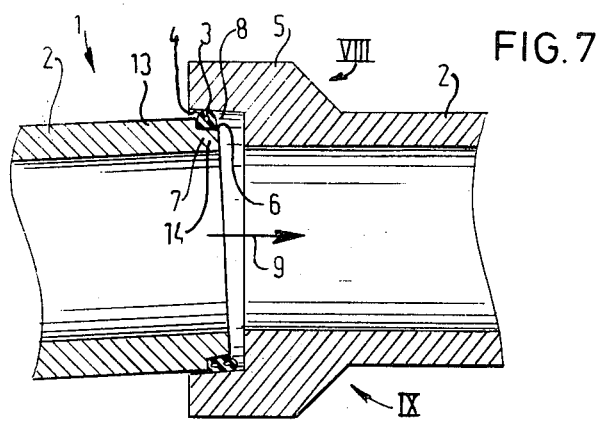
Figure 8:
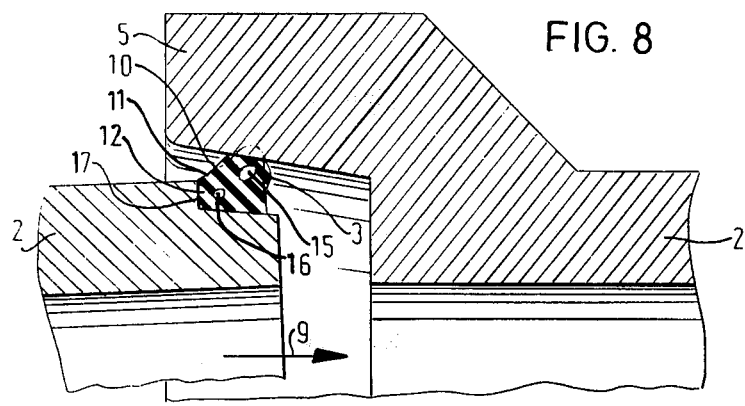
Figure 9:
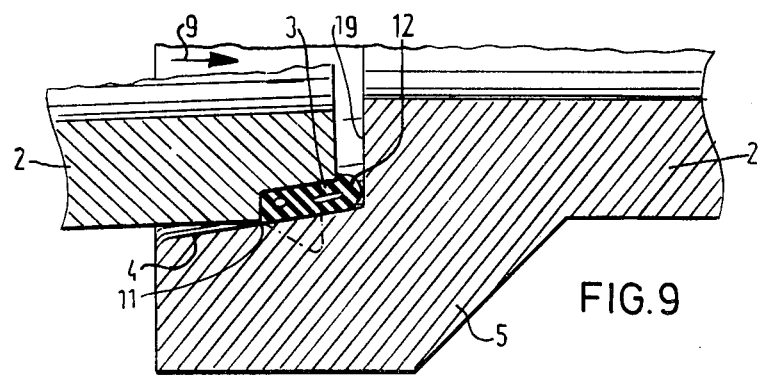
Figure 16:
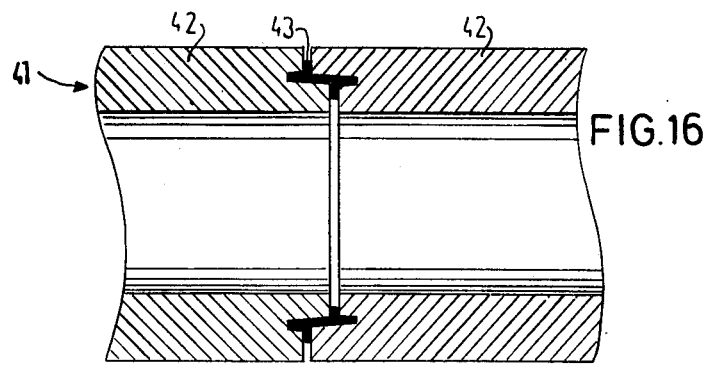
Figure 17:
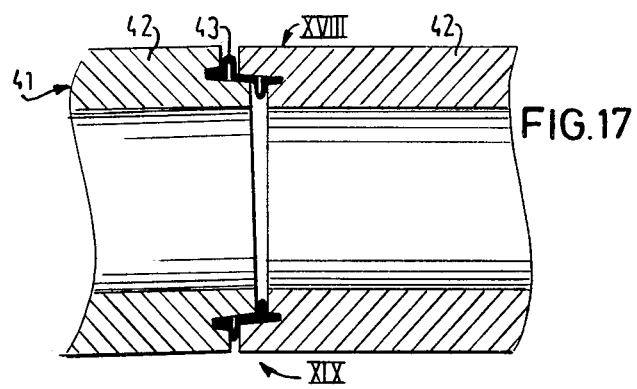
Figure 18:
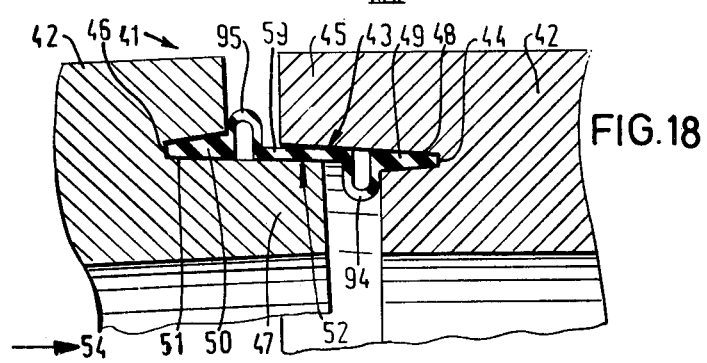
Figure 19:
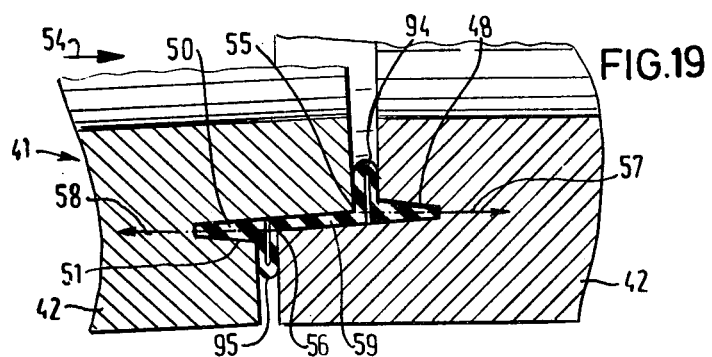
Figure 20:
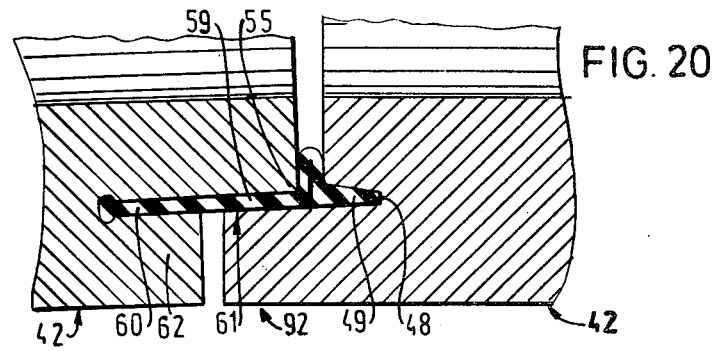
Figure 21:
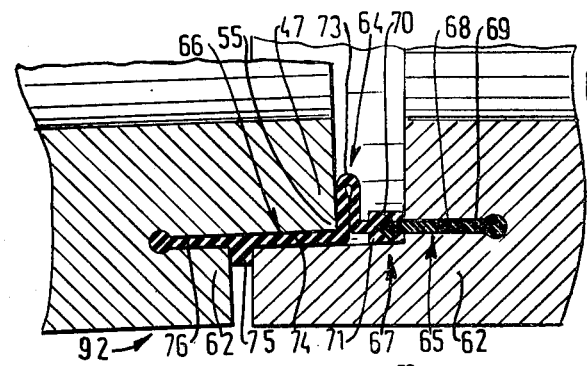
Figure 22:
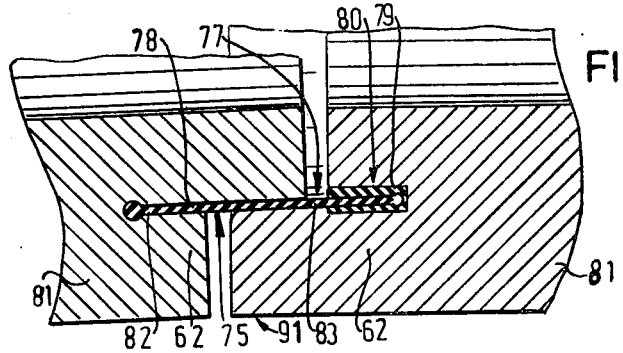
Figure 23:
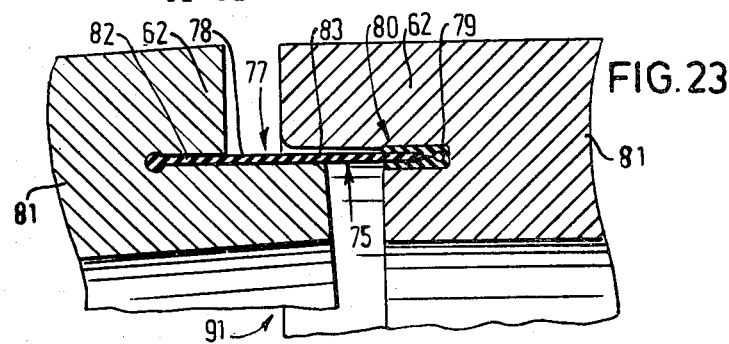
Figure 24:
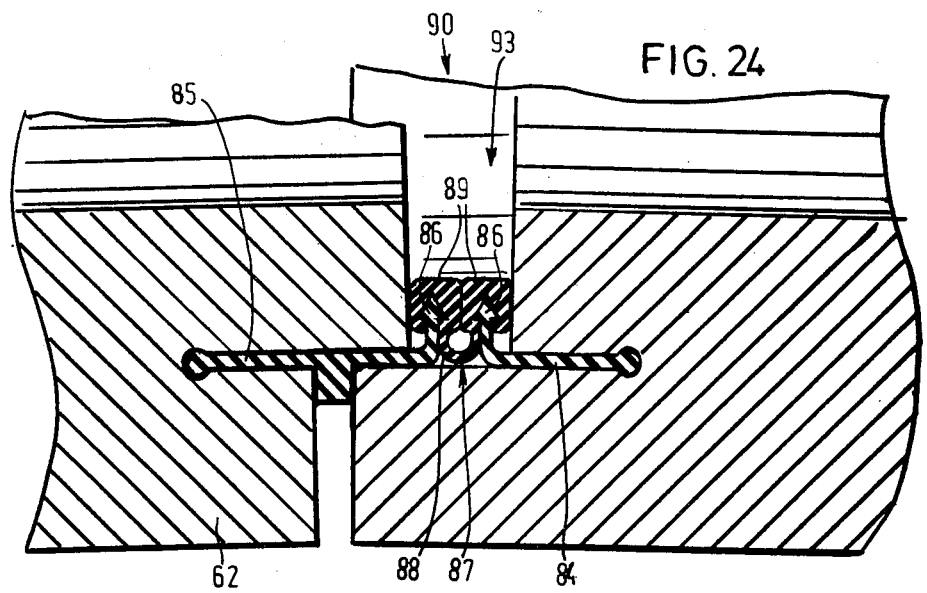
Figure 25:
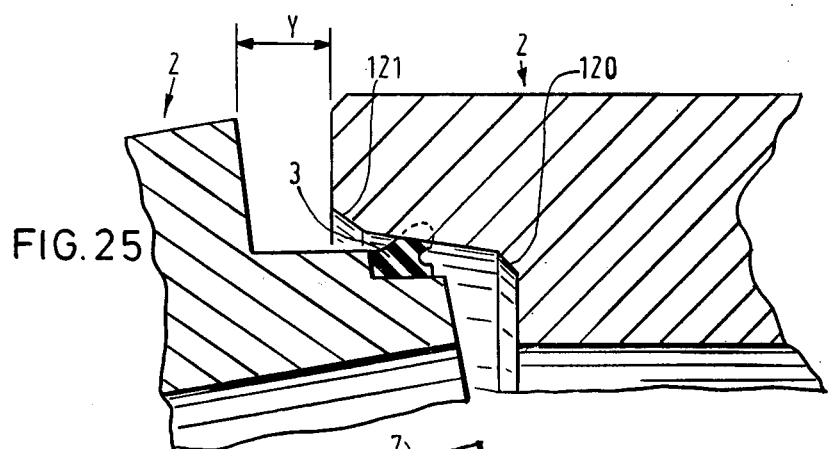
Figure 26:
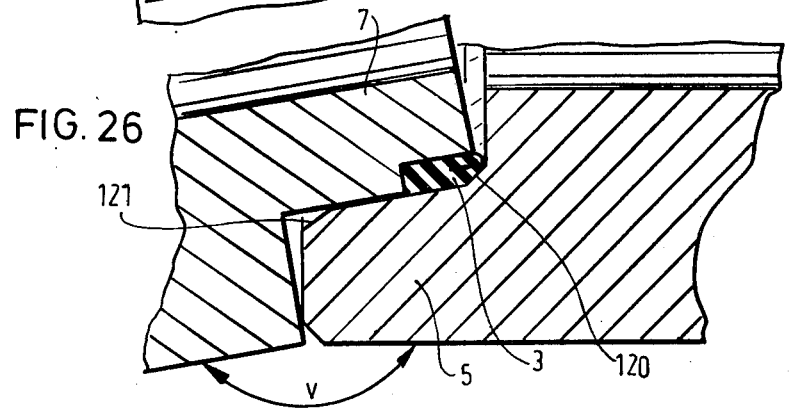

The drawing shows in:

FIGS. 1, 4 and 7 longitudinal sectional views of a watertight seal in accordance with the invention between two concrete elements disposed in respectively different positions, FIG. 2 detail II of FIG. 1 on an enlarged scale during the mounting operation, FIG. 3 detail II of FIG. 1 on an enlarged scale in operational position, FIG. 5 detail V of FIG. 4 on an enlarged scale, FIG. 6 detail VI of FIG. 4 on an enlarged scale, FIG. 8 detail VIII of FIG. 7 on an enlarged scale, FIG. 9 detail IX of FIG. 7 on an enlarged scale, FIGS. 10 to 15 respectively different sealing strips arranged in a groove for obtaining a watertight seal in accordance with the invention, FIGS. 16 and 17 longitudinal sectional view of a further watertight seal in accordance with the invention arranged between two concrete elements in respectively different positions, FIGS. 18 and 19 details XVIII and XIX respectively of FIG. 17, FIGS. 20, 21, 22 and 24 sectional view like FIG. 19 of respectively different watertight seals in accordance with the invention, FIG. 23 is a sectional view corresponding to FIG. 18 of a watertight seal shown in FIG. 22, and FIGS. 25 and 26 each a detail corresponding with the details of FIGS. 8 and 9, but relating to another seal according to the invention.

The watertight seal 1 of FIG. 1 is arranged between adjoining prefabricated culvert elements, tunnel sections, sewer pipes or similar concrete elements 2. An elastic sealing strip 3 is arranged between a sealing surface 4 of a socket 5 of one concrete element 2 and a sealing surface 6 of a wedge 7 of the other concrete element 2 enveloped by the socket 5. One sealing surface 6 has a groove 8 retaining the elastic sealing strip 3 in an axial direction, whereas the other sealing surface 4—viewed in the axial direction 9 from the bonded end 13 of the wedge 7 towards the free end 14 of said wedge—is converging. In the unstressed state the profile of the sealing strip 3 (FIG. 2) has a ridge 10 directed towards the converging sealing surface 4 and adjoining a profile surface 11 diverging in the direction of convergence 9 of the converging sealing surface 4. Two channels 15 and 16 are recessed in the elastic material 12 of the elastic sealing strip 3, whilst the sealing strip 3 has a profile such that, when the two concrete elements 2 are slid towards one another, material 12 of the sealing strip shifts in the direction of convergence 9 of the converging sealing surface 4 (see FIG. 3). The channel 15, which is located at a large distance from the groove edge 17 and which has an ample passage, is of great importance to the invention, because this channel 15 facilitates the aforesaid shift of the material 12 in the direction 9. Near the edge 17 of the groove the sealing strip 3 is rigid; at this place there is no channel or there is only one channel 16 having a narrow passage.

The invention provides a sealing strip requiring a minimum amount of material 12 being on the one hand sufficiently rigid to avoid jamming between the groove edge 17 and the sealing surface 4 and nevertheless being on the other hand capable of bridging a large clearance space t in the zone (FIG. 5), since in the zone (FIG. 6) having minimum clearance space the groove edge 17 strikes the converging sealing surface 4. This occurs in the case of non-circularity of the socket 5 and/or the wedge 7 and/or in the case of an eccentric interengagement (FIGS. 5 and 6) and/or by an interengagement by an angular turn (FIGS. 7 to 9). The clearance space t is at least 8 mm, is preferably at least 10 mm and is e.g. equal to 11 mm. The axial boundary in the sliding interlock of the concrete elements 2 is formed by the contact of the material 12 with the inner front face 19 of the socket 5 (FIGS. 6 and 9). It is noted that for better elucidating the drawing the clearance space t has been exaggerated in FIGS. 3 and 5. In reality the sealing strip 3 in its non-compressed condition projects beyond the groove edge 17 over a height w, which height—seen in radial direction of the seal—amounts up to at least 140%, preferably 160% and e.g. 170%, of the clearance space t.

The channels 15 and 16 are surrounded all around by elastic material 12 and are, therefore, closed so that the contents, for example, air, shifts from the narrow zone (FIG. 9) towards the wide zone (FIG. 8) where the sealing strip 3 is, so to say, slightly inflated. This applies to air filling and to a greater extent to fluid filling. As the case may be, the channels 15 and 16 may be filled with foam rubber.

The sealings strips 20 to 25 of FIGS. 10 to 15 operate in the same manner as the sealing strip 3, but they have a different transverse profile. The sealing strips 20, 21, 22 and 23 each have at the groove edge 17 a height q, which is smaller than the groove height r.

The sealing strip 25 of FIG. 15 is integral with an elastic stop sleeve 26, so that the height v of the groove 8 is equal to the height of the slightly depressed stop sleeve 26 togeter with the height r of the concrete 27. As illustrated in FIGS. 10, 13 and 14 the tendency to an axial shift direction 9 is furthered by a bevelled part 28. As shown in FIG. 11, said shift is furthered by a thin kinked wall 29 between the front side 30 and the channel 15. The sealing strip 22 of FIG. 12 has a recessed channel 31 open to the front side. Nevertheless the sealing strip 22 has a rigidity such that it engages the sealing surface 4 with a vigorous contact pressure.

The sealing strips 23 and 24 (FIGS. 13 and 14) are embedded by means of an anchor ring 32 in the concrete 33 of the concrete element 2. As shown in FIG. 14, the groove 34 is essentially formed by bevelling the free edge 35 of the wedge 7. Therefore, the wedge 7 may be short. FIG. 15 shows that the sealing strip 25 is moulded together with the stop sleeve 26. In this case an elastic and at the same time rigid stop sleeve 26 disposed outside of the groove 8 is combined with a weak, flexible sealing strip 25 being thus capable of absorbing a large clearance variation.

The waterproof seal 41 of FIGS. 16 to 19, like the waterproof seals 90, 91 and 92 (FIGS. 20 to 24), is arranged between two adjoining, prefabricated concrete elements 42. An elastic sealing strip 43 is accommodated between a sealing surface 44 of a socket 45 of one concrete element 42 and a sealing surface 46 of an annular wedge 47 of the other concrete element 42 enveloped by the socket 45. In FIGS. 16 to 19 each sealing surface 44 and 46 has a wedge-shaped groove 48 receiving the elastic sealing strip 43. The sealing strip 43 has a first anchor ring 49, which is accommodated in a watertight relationship in a groove 48 of one sealing surface 44, a second anchor ring 50 accommodated in a watertight relationship in a groove 51 of the other sealing surface 46 and a sleeve 52 arranged between the two anchor rings 49 and 50 and forming a closed unit therewith, said sheet allowing a relative axial displacement of the anchor rings 49 and 50 and hence of the concrete elements 42. FIGS. 18 and 19 show that the wedge-shaped groove 48, 51 provided in one concrete element 42—viewed in an axial direction 54—is located opposite an edge 55, 56 of the other concrete element 42, so that when the concrete elements 42 are joined, the anchor rings 49 and 50 are firmly and hence permanently pressed in a sealing relationship into the grooves 48, 51 along the pressure lines 57 and 58. The sleeve 52 is folded in the axial direction 54, that is to say, with an internal, annular fold 94 and an external fold 95, whilst the intermediate surface portion 59 constitutes a radial stop avoiding the impact of concrete on concrete. The folds 94 and 95 allow a large relative displacement and/or a large relative angular turn of the concrete elements 42, whilst the imperviousness to water is maintained.

The elastic anchor ring 60 of the sealing strip 61 of FIG. 20 is embedded in the concrete 62 of one concrete element 42. In the other concrete element 42 the sealing strip 61 is identical to the sealing strip 43.

The sealing strip 64 of the watertight seal 92 of FIG. 21 comprises two rings 65 and 66 interconnected through a watertight joint 67. The ring 65 of elastic material 68 comprises an anchor ring 69, for example of metal, embedded in the concrete 62 and a coupling ring 70 of hooklike section, around which a coupling ring 71 fits having a complementary sharkhead-like section in order to obtain a waterproof snap joint. The coupling ring 71 forms part of the elastic ring 66, which comprises apart from the coupling ring 71 in order of succession in conjunction herewith a folded sleeve 73, a stop sleeve 74, an impact ring 75 and an anchor ring 76 embedded in the concrete 62. The coupling rings 70 and 71 can be forcibly pressed one into the other since the edge 55 of the wedge 47 is disposed axially opposite the joint 67. The impact ring 75 limits the axial telescopic movement.

The watertight seal 91 of FIGS. 22 and 23 comprises a sealing strip 77 also consisting of two rings 78 and 79 interconnected by means of a sliding joint 80. One ring 79 is embedded as an anchor ring in the concrete 62 of one concrete element 81, it has a U-shaped profile and it is elastic. The other ring 78 of metal or a different, rigid material has an anchor ring 82 embedded in the concrete 62 of the other concrete element 81 and extends in the form of an axially extending cylinder 83 along the outer periphery of the wedge in watertight relationship into the ring 79. In the event of a relative angular turn and/or a relative, axial shift of the concrete elements 81 the ring 83 can slide in the ring 79, whilst the impermeability to water is maintained.

The sealing strip 93 of the watertight seal 90 of FIG. 24 comprises, apart from the two anchor rings 84 and 85 embedded in the concrete 62 and each being provided with a coupling ring 86 of hook-like section, an annular sleeve 87 arranged between the former. The annular sheet comprises two coupling rings 89 of sharkhead-like section arranged one on each side of a fold 88. This annular sheet 87 may, if desired, be put in place afterwards, for example, from the inner side, when the pipe to be laid is accessible from the inner side.

A sealing strip 3 used in FIGS. 25 and 26 having the same profile as that of FIG. 12 is used for sealing concrete tube elements 2 having a square profile with round corners. These FIGS. 25 and 26 show together how the sealing strip 3 will be sufficiently compressed even in case the elements 2 enclose an angle v. This seal does adequately seal, when a distance y of at least 2 cm, preferably of at least 3 cm and for e.g. 4 cm is found at the top between the concrete elements 2, while abutting at their lower sides.

In FIGS. 25 and 26 the socket 5 has declined edges 120 and 121.

What we claim is:

1. A seal for forming a watertight seal between two tubular members, one having a female portion receiving a male portion of the other in which the male and female portions define an annular space when the tubular members are axially shifted together such that said male portion is entered into said female portion, said male portion having a stepped end of reduced diameter which defines a shoulder, said annular space being defined between said male portion and an inwardly tapering surface of said female portion, said seal comprising an annular member of resilient material seated upon said stepped end of the male portion, said annular member having an inner face seated on said stepped end, a first side face seated against said shoulder, a second side face of greater width than said first side face and generally parallel to said shoulder, and an outer face sloping outwardly from said first side face to said second side face whereat a ridge is defined, said seal having an outer diameter greater than that of at least a portion of said inwardly tapering surface whereby said annular member is radially inwardly compressed when said tubular members are brought together, said annular member having an annular channel formed therewithin in the vicinity of said ridge for causing said annular member to collapse during radial inward compression thereof and preferentially bulge said ridge and said second end face deeper into said annular space.

2. A seal as defined in claim 1 including a second annular channel formed in said annular member adjacent the juncture between said inner and first side faces.

3. A seal as defined in claim 1, wherein said annular member is provided with an anchor ring extending radially inwardly from said inner face for embedment in said male portion.

4. A seal for forming a watertight seal between two tubular members, one having an inwardly tapering female portion receiving a male portion of the other to define an annular space therebetween when the tubular members are axially shifted together such that said male portion is entered into said female portion, said male portion having a stepped, reduced diameter end to define a shoulder, said seal comprising an annular member of resilient material having an inner face seated upon said stepped end and surrounding said male portion, said annular member having an inner end face seated against said shoulder, an outer surface which inclines outwardly from said inner end face and an outer end face which intersects with said outer surface and is generally parallel to said shoulder, said outer surface at least in that region of intersection with said outer end face being of a diameter in relaxed condition which requires such region of the annular member to be radially inwardly deformed when said tubular members are axially shifted together, and said annular member having an annular channel in said region for causing said region of the annular member to bulge generally axially toward said one member in response to said radial inward deformation.

5. A seal as defined in claim 4 including a second annular channel formed in said annular member in that region adjacent the intersection between said inner face and said inner end face.

* * * * *